United States Patent
Cooper et al.

(10) Patent No.: US 10,008,080 B1
(45) Date of Patent: Jun. 26, 2018

(54) LOCATABLE PACIFIER

(71) Applicants: Alex Cooper, Delray Beach, FL (US); Stephanie Cooper, Delray Beach, FL (US)

(72) Inventors: Alex Cooper, Delray Beach, FL (US); Stephanie Cooper, Delray Beach, FL (US)

(*) Notice: Subject to any disclaimer, the term of this patent is extended or adjusted under 35 U.S.C. 154(b) by 0 days. days.

(21) Appl. No.: 15/652,339

(22) Filed: Jul. 18, 2017

(51) Int. Cl.
G08B 7/06 (2006.01)
H04W 84/12 (2009.01)
H04W 4/00 (2018.01)
H04W 4/80 (2018.01)

(52) U.S. Cl.
CPC ............... *G08B 7/06* (2013.01); *H04W 4/008* (2013.01); *H04W 4/80* (2018.02); *H04W 84/12* (2013.01)

(58) Field of Classification Search
CPC ......... G06K 2017/0045; G06K 7/0008; G06K 7/10366; G06K 7/10079; G06K 17/00; G06K 19/0723; G06K 2017/0051; G06K 19/077
USPC .......................................................... 340/8.1
See application file for complete search history.

(56) References Cited

U.S. PATENT DOCUMENTS

| 6,066,161 | A  | * | 5/2000  | Parella    | A61J 17/005  |
|           |    |   |         |            | 446/175      |
| 6,102,935 | A  | * | 8/2000  | Harlan     | G08B 21/24   |
|           |    |   |         |            | 606/234      |
| 6,809,644 | B1 | * | 10/2004 | Titus      | G08B 21/0208 |
|           |    |   |         |            | 340/539.15   |
| D604,858  | S  |   | 11/2009 | Neal       |              |
| 8,810,374 | B1 | * | 8/2014  | Giegoldt   | G08B 21/24   |
|           |    |   |         |            | 340/10.1     |
| 9,114,064 | B2 | * | 8/2015  | Kountotsis | A61B 5/6802  |
| 9,125,799 | B1 | * | 9/2015  | Freeman    | A61J 17/005  |
| 9,478,117 | B2 |   | 10/2016 | Salina     |              |
| 9,687,192 | B2 | * | 6/2017  | Cunningham | A61B 5/4552  |
| 2015/0272447 | A1 | * | 10/2015 | Ford    | A61B 5/01    |
|           |    |   |         |            | 600/549      |
| 2016/0291603 | A1 | * | 10/2016 | Chin    | A61J 7/0015  |
| 2017/0053515 | A1 |   | 2/2017  | Dyer    |              |

FOREIGN PATENT DOCUMENTS

WO          2013185821       12/2013

* cited by examiner

*Primary Examiner* — Mark Blouin

(57) ABSTRACT

The locatable pacifier is a locating device. The locatable pacifier is adapted for use with a pacifier. The locatable pacifier comprises the pacifier, a control system, a personal data device, and a wireless communication link. The control system is installed within the pacifier. The control system is tethered to the personal data device using a wireless communication link. Should the locatable pacifier become lost, the personal data device can be used to initiate the operation of a control system to generate visible and audible signals identifying the location of the locatable pacifier.

10 Claims, 5 Drawing Sheets

LOCATABLE PACIFIER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of parents or care givers of infants and toddlers, more specifically, baby comforter with a means for emitting light and producing sound allowing an end user to locate the pacifier.

SUMMARY OF INVENTION

The locatable pacifier is a locating device. The locatable pacifier is adapted for use with a pacifier. The locatable pacifier comprises the pacifier, a control system, a personal data device, and a wireless communication link. The control system is installed within the pacifier. The control system is tethered to the personal data device using a wireless communication link. Should the locatable pacifier become lost, the personal data service can be used to initiate the operation of a control system to generate visible and audible signals identifying the location of the locatable pacifier.

These together with additional objects, features and advantages of the locatable pacifier will be readily apparent to those of ordinary skill in the art upon reading the following detailed description of the presently preferred, but nonetheless illustrative, embodiments when taken in conjunction with the accompanying drawings.

In this respect, before explaining the current embodiments of the locatable pacifier in detail, it is to be understood that the locatable pacifier is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the locatable pacifier.

It is therefore important that the claims be regarded as including such equivalent construction insofar as they do not depart from the spirit and scope of the locatable pacifier. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
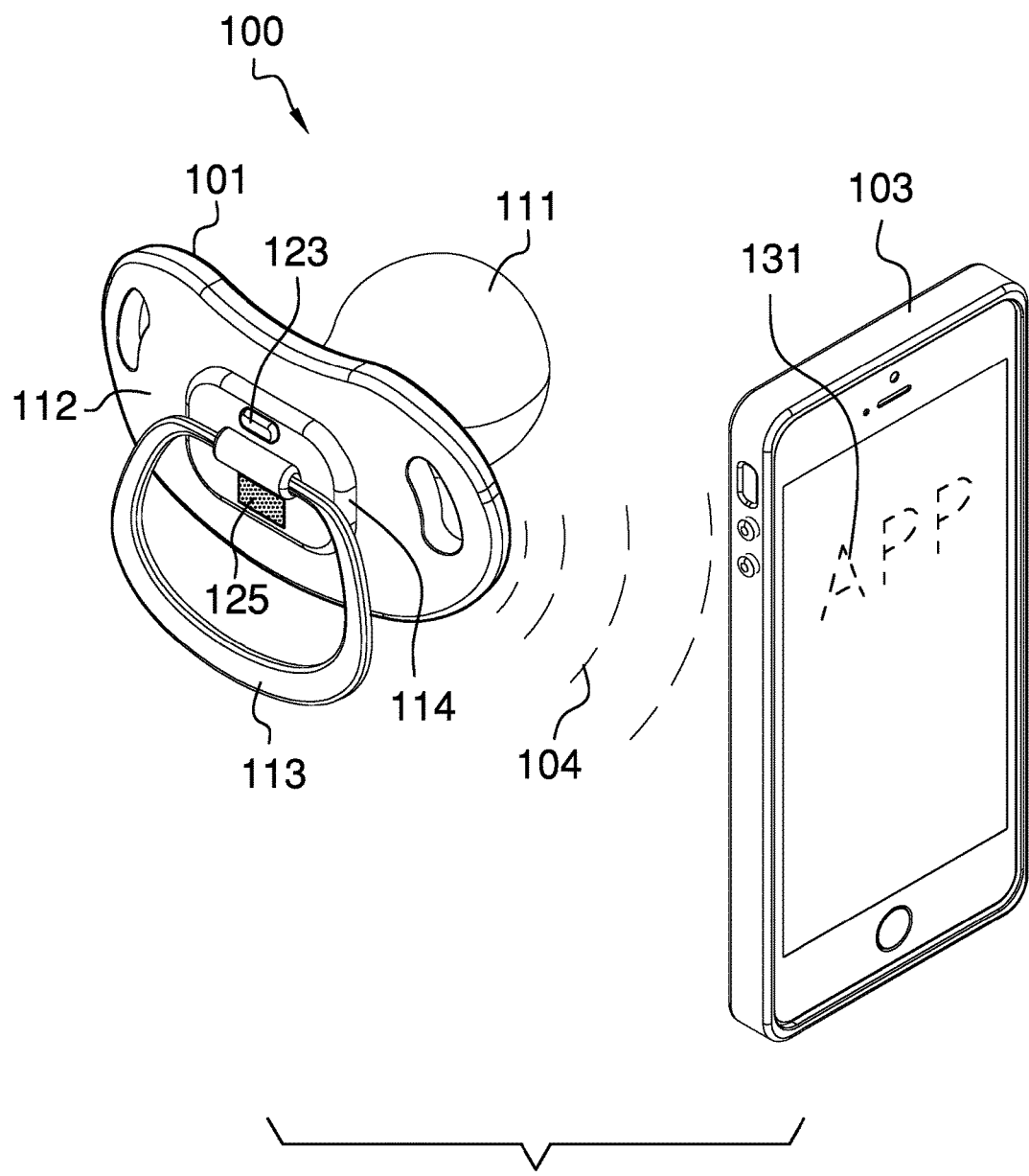
FIG. 1 is a perspective view of an embodiment of the disclosure.
Figure 2:
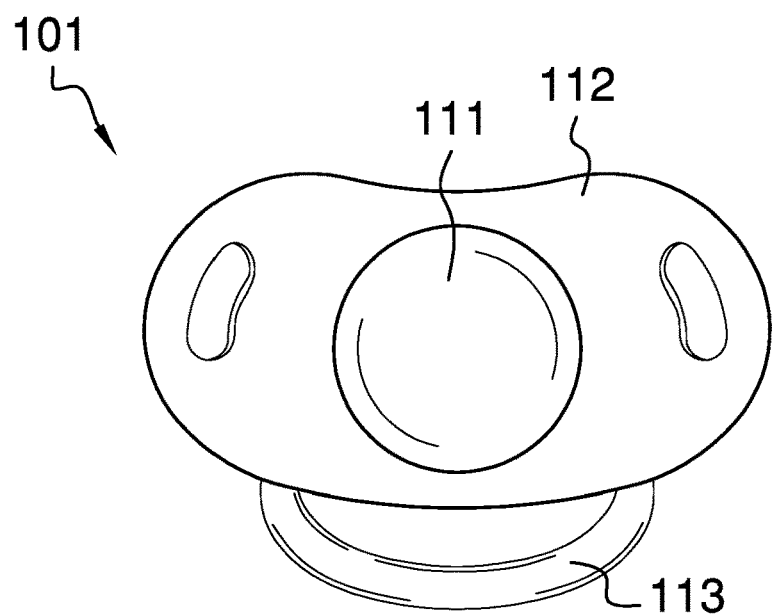
FIG. 2 is a rear view of an embodiment of the disclosure.
Figure 3:
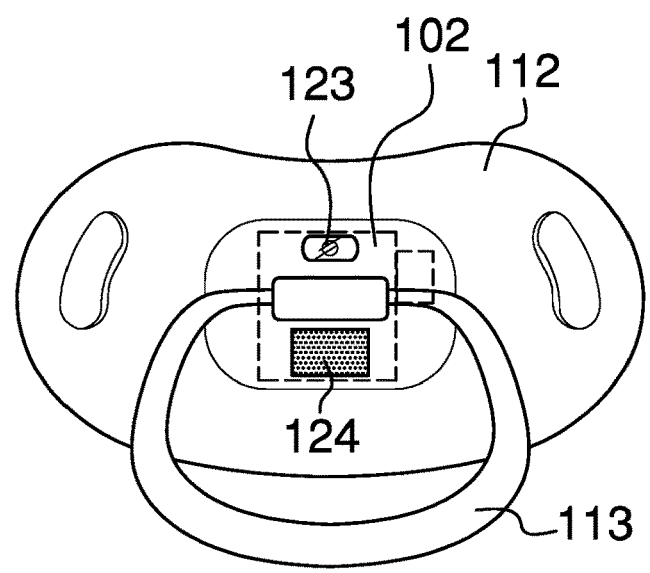
FIG. 3 is a front view of an embodiment of the disclosure.
Figure 4:
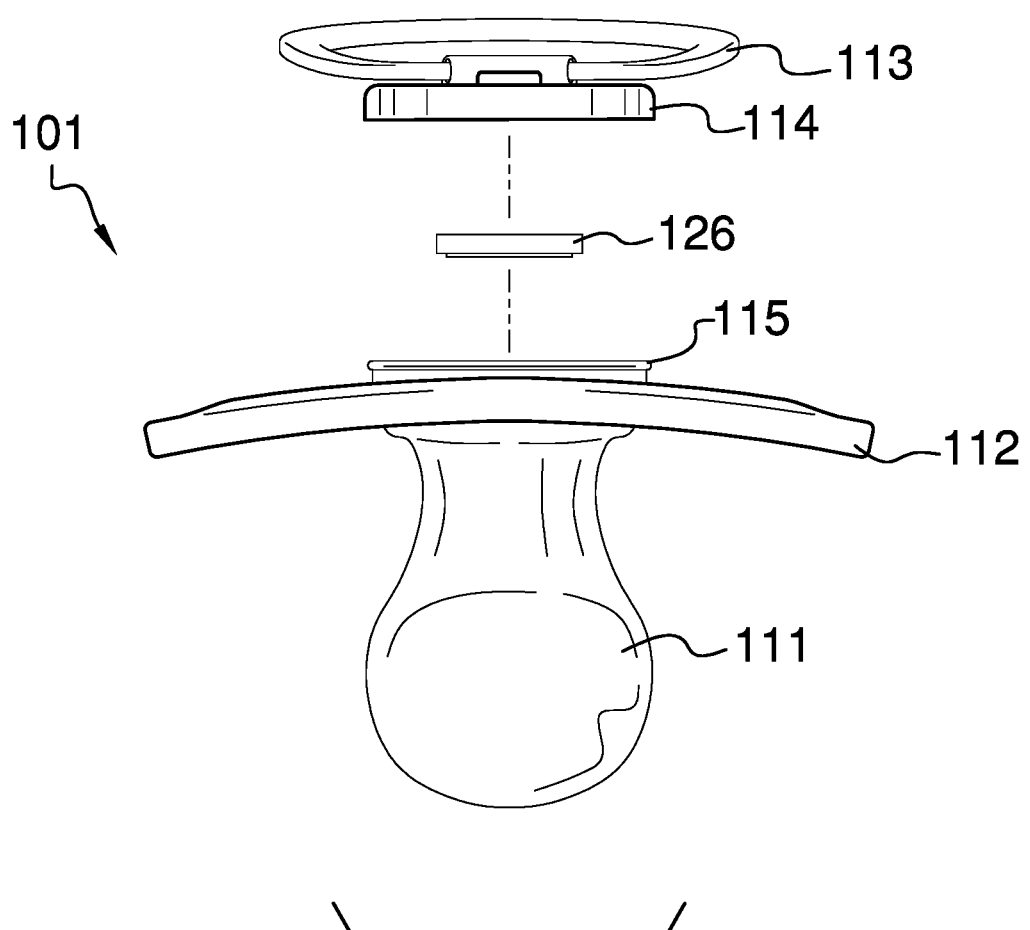
FIG. 4 is an exploded view of an embodiment of the disclosure.
Figure 5:
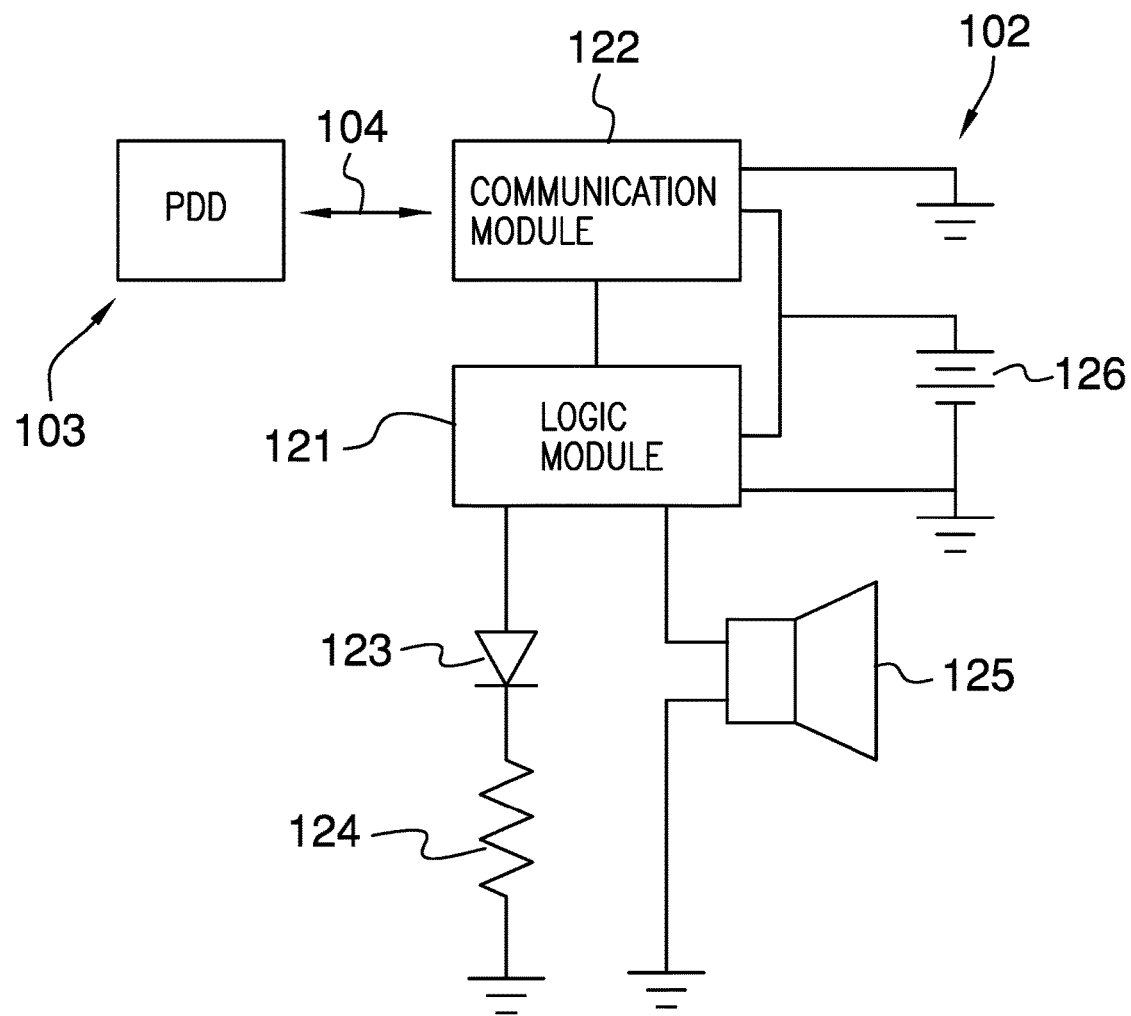
FIG. 5 is a block diagram of an embodiment of the disclosure.
Figure 6:
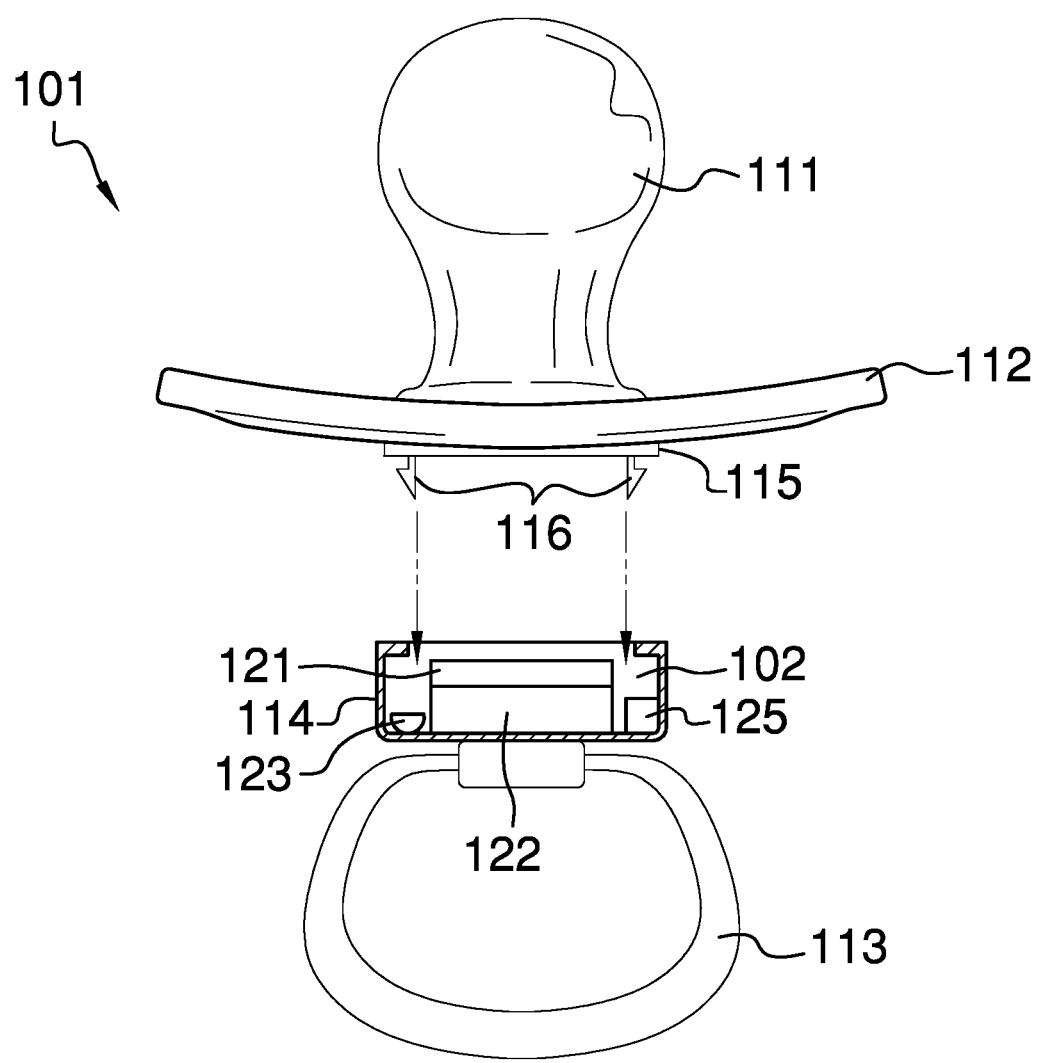
FIG. 6 is a detail view of an embodiment of the disclosure.

Detailed reference will now be made to one or more potential embodiments of the disclosure, which are illustrated in FIGS. 1 through 6.

The locatable pacifier 100 (hereinafter invention) is a locating device. The invention 100 is adapted for use with a pacifier 101. The invention 100 comprises the pacifier 101, a control system 102, a personal data device 103, and a wireless communication link 104. The control system 102 is installed within the pacifier 101. The control system 102 is tethered to the personal data device 103 using a wireless communication link 104. Should the invention 100 become lost, the personal data device 103 can be used to initiate the operation of a control system 102 to generate visible and audible signals identifying the location of the invention 100.

The invention 100 is intended for manufacture as a single integrated unit that is custom built for its purpose. While the invention 100 is intended to be manufactured as a single unit, the invention 100 will be described under the assumption that the invention 100 system is formed as a modification to an existing pacifier 101 that is commercially available. This assumption is made solely for the purposes of simplicity and clarity of exposition of the disclosure and is not intended to limit the scope of the appended claims. Those skilled in the art will recognize that the invention 100 can be formed using either method with a minimum of modification and experimentation.

The pacifier 101 is a device that is used to comfort infants and toddlers. Generally, a pacifier 101 is a well-known and commercially available device. Within this disclosure, the pacifier 101 is modified through the addition of the locating technology. The pacifier 101 comprises a nipple 111, a mouth guard 112, a ring 113, a chamber mount 114, a gasket 115, and one or more clips 116.

The nipple 111 is a small projection that is attached to a surface of the mouth guard 112. The nipple 111 is the portion of the pacifier 101 that is placed in an infant's mouth. The mouth guard 112 is a curved plate structure that is placed over the oral fissure after the nipple 111 is inserted into the mouth. The ring 113 is a grip that is attached to the chamber mount 114. The ring 113 is used by the user to insert the pacifier 101 and remove the pacifier 101 from the mouth of the infant.

The chamber mount 114 is a hollow structure that: 1) contains the control system 102 within the interior space of the hollow structure; and 2) attaches the ring 113 to the surface of the mouth guard 112 that is distal from the placement surface of the nipple 111. The chamber mount 114 is formed in the shape of a rounded rectangular block. The chamber mount 114 is formed with all apertures necessary to accommodate the beacon. The gasket 115 is an elastomeric material that is placed between the mouth guard 112 and the chamber mount 114. The gasket 115 forms a water impermeable seal that prevents liquids from entering the interior space of the chamber mount 114. The gasket 115 prevents liquids from being introduced into the control system 102. Each of the one or more clips 116 are used to attach the chamber mount 114 to the mouth guard 112.

The chamber mount 114 and the mouth guard 112 are rigid structures that are formed from a water impermeable material. In the first potential embodiment of the disclosure, each of the one or more clips 116 is a locking tab.

The control system 102 is an electrical device that is added to the pacifier 101. The control system 102: 1) monitors the wireless communication link 104 for an initiation signal from the personal data device 103; and, 2) upon receipt of the initiation signal from the personal data device 103 generates the visible and audible signals that act as a beacon that guides the user to the location of the invention 100. The control system 102 comprises a logic module 121, a communication module 122, a LED 123, a limit resistor 124, and a speaker 125.

The logic module 121 is a readily and commercially available programmable electronic device that is used to manage, regulate, and operate the control system 102. Depending on the specific design and the selected components, the logic module 121 can be a separate component within the in control system 102 or the functions of the logic module 121 can be incorporated into another component within the control system 102. The communication module 122 is a wireless electronic communication device that allows the logic module 121 to wirelessly communicate with a locally presented device such as the personal data device 103. Specifically the communication module 122 establishes a wireless communication link 104 between the control system 102 and the personal data device 103 or other locally presented device. In the first potential embodiment of the disclosure the communication module 122 supports a communication protocol selected from the group consisting of a WiFi protocol or a Bluetooth protocol.

The LED 123 is a two terminal electrical device that generates a light when an electrical current is passed through the LED 123. The operation of the LED 123 is controlled by the logic module 121. The LED 123 is used to generate the visible portion of the beacon. The limit resistor 124 is a two terminal electrical device that limits current flow through the LED 123. The limit resistor 124 is wired in series with the LED 123.

The speaker 125 is a commercially available transducer that is used to generate the audible portion of the beacon. The speaker 125 is controlled by the logic module 121. In the first potential embodiment of the disclosure, the speaker 125 is a buzzer.

The control system 102 is powered through the use of a battery 126. In the first potential embodiment of the disclosure, the battery 126 is a button cell battery.

The wireless communication link 104 is a communication channel that is established between the control system 102 and the personal data device 103 such that the personal data device 103 can send an initiation signal to the control system 102. In the first potential embodiment of the disclosure, the communication channel established through the wireless communication link 104 is a wireless connection.

The personal data device 103 is a commercially available device that is maintained by the user for a plurality of purposes. The personal data device 103 is a logical device which: 1) is capable of establishing a wireless communication link 104 with the control system 102; and, 2) runs an application 131 that allows the user to initiate the operation of the control system 102. The personal data device 103 comprises an application 131. The application 131 is a logical process that operates on the personal data device 103 for the purpose of: 1) creating the wireless communication link 104 with the communication module 122; and, 2) generating the initiation signal that causes the control system 102 to illuminate the LED 123 and generate an audible sound over the speaker 125.

The following definitions were used in this disclosure:

Application or App: As used in this disclosure, an application or app is a self-contained piece of software that is especially designed or downloaded for use with a personal data device.

Battery: As used in this disclosure, a battery is a chemical device consisting of one or more cells, in which chemical energy is converted into electricity and used as a source of power.

Beacon: As used in this disclosure, a beacon refers to a detectable signal that draws the attention of a person or a device to a location. A beacon is commonly used as a guide to the location or as a warning signal about the location.

Bluetooth: As used in this disclosure, Bluetooth is a standardized communication protocol that is used to wirelessly interconnect electronic devices.

Button Cell Battery: As used in this disclosure, a button cell battery is a disk shaped battery that is commonly used in powering watches.

Buzzer: As used in this disclosure, a buzzer is two lead electrical device that generates an audible sound when voltage is applied to the two leads.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end. The cantilever acts as a spring. Specifically, when a force is applied perpendicularly to the surface of the cantilever, the elasticity of the cantilever creates a rotational torque that opposes the displacement created by rotating the cantilever around a pivot point located at the first end where the cantilever is attached to the receptacle. This rotational torque places a strain on the cantilever such that the force of the strain is in the direction that returns the cantilever to its original position. When an object is inserted between the cantilever and the receptacle, this spring like action produces a clamping force.

Control System: As used in this disclosure, a control system is a first device or system that manages and regulates the behavior or operation of a second device or system.

Diode: As used in this disclosure, a diode is a two terminal semiconductor device that allows current flow in only one direction. The two terminals are called the anode and the cathode. Electric current is allowed to pass from the anode to the cathode.

Electrical Ground: As used in this disclosure, an electrical ground is a common reference voltage that is used in the design and implementation of electrical circuits. An electrical ground is often, but not necessarily, the discharge point of electric currents flowing through an electric circuit.

Gasket: As used in this disclosure, a gasket is an elastomeric material that is placed between a first surface and a second surface for the purpose of: 1) creating a liquid or gas impermeable seal between the first surface and the second surface; or, 2) preventing the first surface from damaging the second surface (or vice versa).

Infant: As used in this disclosure, an infant refers to a human child who: 1) is under 18 months old; and, 2) has not yet learned to walk.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Locking Tab: As used in this disclosure, a locking tab is a two element fastener wherein the first element of the fastener, which is mounted on a first object is a cantilever spring and the second element of the fastener is a hole which is formed in a second object. The free end of the cantilever spring has a hook formed in it such that when the free end of the cantilever spring is inserted into the hole, the hook latches against the edge of the hole preventing inadvertent removal of the cantilever spring. The first element is removed from the second element by bending the cantilever spring such that the hook clears the edge of the hole and then pulling the first element away from the second element.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

PDD: As used in this disclosure, PDD is an acronym for personal data device.

Personal Data Device: As used in this disclosure, a personal data device is a handheld device that is used for managing personal information and communication. Examples of personal data device include, but are not limited to, cellular phones, tablets and smart phones.

Plate: As used in this disclosure, a plate is a smooth, flat and semi-rigid or rigid structure that has at least one dimension that: 1) is of uniform thickness; and 2) that appears thin relative to the other dimensions of the object.

Rectangular Block: As used in this disclosure, a rectangular block refers to a three dimensional structure comprising six rectangular surfaces formed at right angles. Within this disclosure, a rectangular block may further comprises rounded edges and corners.

Ring: As used in this disclosure, a ring is term that is used to describe a flat or plate like structure through which an aperture is formed.

Rounded: A used in this disclosure, the term rounded refers to the replacement of an apex or vertex of a structure with a (generally smooth) curvature wherein the concave portion of the curvature faces the interior or center of the structure.

Rounded Rectangle: A used in this disclosure, a rounded rectangle is a rectangle wherein one or more of the corner structures of the rectangle are replaced with a curvature wherein the concave portion of the curvature faces the center of the rounded rectangle.

Speaker: As used in this disclosure, a speaker is an electrical transducer that converts an electrical signal into an audible sound.

Toddler: As used in this disclosure, a toddler is a human child between the ages of one and three who has learned to walk.

Transducer: As used in this disclosure, a transducer is a device that converts a physical quantity, such as pressure or brightness into an electrical signal or a device that converts an electrical signal into a physical quantity.

WiFi: As used in this disclosure, WiFi refers to the physical implementation of a collection of wireless electronic communication standards commonly referred to as IEEE 802.11x.

Wireless: As used in this disclosure, wireless is an adjective that is used to describe a communication channel between two terminals that does not require the use of physical cabling.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A baby comforting device comprising
a pacifier, a control system, a personal data device, and a wireless communication link;
wherein the control system is installed within the pacifier;
wherein the control system is tethered to the personal data device using the wireless communication link;
wherein the operation of a control system generates a beacon comprising a visible signal and an audible signal;
wherein the personal data device initiates the operation of a control system;
wherein the pacifier is further defined with a nipple and a mouth guard;
wherein the pacifier comprises a ring, a chamber mount, a gasket, and one or more clips;
wherein the one or more clips attaches the chamber mount to the mouth guard;
wherein the chamber mount attaches the ring to the mouth guard;
wherein the gasket is placed between the chamber mount and the mouth guard;
wherein the control system is an electrical device;
wherein the control system monitors the wireless communication link for an initiation signal from the personal data device;

wherein upon receipt of the initiation signal from the personal data device the control system generates the visible and audible signals of the beacon;
wherein the chamber mount is a hollow structure;
wherein the chamber mount is a rigid structure;
wherein the chamber mount is formed from a water impermeable material;
wherein the control system is contained within the interior space of the hollow structure;
wherein the chamber mount attaches to the surface of the mouth guard that is distal from the nipple;
wherein the gasket is an elastomeric material;
wherein the gasket forms a water impermeable seal that prevents liquids from entering the interior space of the chamber mount;
wherein each of the one or more clips attach the chamber mount to the mouth guard;
wherein the control system comprises a logic module, a communication module, a LED, a limit resistor, and a speaker;
wherein the logic module, the communication module, the LED, the limit resistor, and the speaker are electrically interconnected;
wherein the logic module is a programmable electronic device;
wherein the communication module is a wireless electronic communication device;
wherein the communication module establishes the wireless communication link between the communication module and the personal data device.

2. The baby comforting device according to claim 1
wherein the LED is a two terminal electrical device that generates a light when an electrical current is passed through the LED;
wherein the operation of the LED is controlled by the logic module;
wherein the LED generates the visible portion of the beacon.

3. The baby comforting device according to claim 2
wherein the speaker is a transducer;
wherein the speaker is controlled by the logic module;
wherein the speaker generates the audible portion of the beacon.

4. The baby comforting device according to claim 3
wherein the personal data device is a logical device;
wherein the personal data device maintains the wireless communication link with the personal data device.

5. The baby comforting device according to claim 4
wherein the personal data device comprises an application;
wherein the application is a logical process that operates on the personal data device;
wherein the application establishes the wireless communication link with the communication module;
wherein the application generate the initiation signal.

6. The baby comforting device according to claim 5
wherein the limit resistor is a two terminal electrical device that limits current flow through the LED;
wherein the limit resistor is wired in series with the LED.

7. The baby comforting device according to claim 6 wherein the speaker is a buzzer.

8. The baby comforting device according to claim 7 wherein each of the one or more clips is a locking tab.

9. The baby comforting device according to claim 1
wherein the control system comprises a logic module, a communication module, a LED, a limit resistor, and a speaker;
wherein the logic module, the communication module, the LED, the limit resistor, and the speaker are electrically interconnected;
wherein the logic module is a programmable electronic device;
wherein the communication module is a wireless electronic communication device;
wherein the communication module establishes the wireless communication link between the communication module and the personal data device;
wherein the LED is a two terminal electrical device that generates a light when an electrical current is passed through the LED;
wherein the operation of the LED is controlled by the logic module;
wherein the LED generates the visible portion of the beacon;
wherein the speaker is a transducer;
wherein the speaker is controlled by the logic module;
wherein the speaker generates the audible portion of the beacon;
wherein the personal data device is a logical device;
wherein the personal data device maintains the wireless communication link with the personal data device;
wherein the personal data device comprises an application;
wherein the application is a logical process that operates on the personal data device;
wherein the application establishes the wireless communication link with the communication module;
wherein the application generate the initiation signal;
wherein the limit resistor is a two terminal electrical device that limits current flow through the LED;
wherein the limit resistor is wired in series with the LED.

10. The baby comforting device according to claim 9
wherein the chamber mount is a hollow structure;
wherein the chamber mount is a rigid structure;
wherein the chamber mount is formed from a water impermeable material;
wherein the control system is contained within the interior space of the hollow structure;
wherein the chamber mount attaches to the surface of the mouth guard that is distal from the nipple;
wherein the gasket is an elastomeric material;
wherein the gasket forms a water impermeable seal that prevents liquids from entering the interior space of the chamber mount;
wherein each of the one or more clips attach the chamber mount to the mouth guard;
wherein each of the one or more clips is a locking tab.

\* \* \* \* \*